United States Patent
Zolotarev et al.

(10) Patent No.: US 12,421,088 B2
(45) Date of Patent: Sep. 23, 2025

(54) CONFIGURABLE VEHICLE LIFT AND SERVICE STATION

(71) Applicant: Ample, Inc., San Francisco, CA (US)

(72) Inventors: Maxim Zolotarev, San Francisco, CA (US); Kenji Bowers, San Francisco, CA (US); Wai Hong Tsang, Daly City, CA (US)

(73) Assignee: Ample, Inc., San Francisco, CA (US)

( * ) Notice: Subject to any disclaimer, the term of this patent is extended or adjusted under 35 U.S.C. 154(b) by 318 days.

(21) Appl. No.: 18/317,985

(22) Filed: May 16, 2023

(65) Prior Publication Data

US 2024/0383729 A1    Nov. 21, 2024

(51) Int. Cl.
  *B66F 7/00* (2006.01)
  *B60L 53/36* (2019.01)
  *B66F 7/06* (2006.01)

(52) U.S. Cl.
  CPC .............. *B66F 7/065* (2013.01); *B60L 53/36* (2019.02); *B66F 7/00* (2013.01)

(58) Field of Classification Search
  CPC .... B66F 7/065; B66F 7/00; B66F 7/28; B60L 53/36
  See application file for complete search history.

(56) References Cited

U.S. PATENT DOCUMENTS

| | | | |
|---|---|---|---|
| 4,102,273 A | 7/1978 | Merkle et al. | |
| 5,545,967 A | 8/1996 | Osborne et al. | |
| 5,825,981 A | 10/1998 | Matsuda | |
| 6,094,028 A | 7/2000 | Gu et al. | |
| 7,066,291 B2 | 6/2006 | Martins et al. | |
| 7,139,642 B2 | 11/2006 | Kamoto et al. | |
| 8,006,793 B2 | 8/2011 | Heichal et al. | |
| 8,516,687 B2 | 8/2013 | Hozumi et al. | |

(Continued)

FOREIGN PATENT DOCUMENTS

| | | | |
|---|---|---|---|
| CN | 104787010 A | * | 7/2015 |
| CN | 104787010 B | | 9/2017 |

(Continued)

OTHER PUBLICATIONS

ISA, International Search Report for PCT/US2024/029708, Aug. 14, 2024.

(Continued)

*Primary Examiner* — Justin Holmes
(74) *Attorney, Agent, or Firm* — Intrinsic Law Corp.

(57) ABSTRACT

A vehicle lift includes a platform having an adjustable length according to a wheelbase of the vehicle. A plurality of clamps are mounted on the platform, each clamp having an adjustable lateral position with respect to a width of the platform to mechanically engage a respective tire of the vehicle when the vehicle is located on the platform. A plurality of motorized lifts are located below the platform, each lift mechanically coupled to the platform, each motorized lift having an adjustable height to raise and lower the platform. Each motorized lift is moveable with respect to the first axis to vary the adjustable length of the platform and with respect to the second axis to adjust the lateral position of the respective clamp. When the platform is in a raised position, a service cavity is defined between the platform and a floor to receive a service robot.

22 Claims, 15 Drawing Sheets

(56) References Cited

U.S. PATENT DOCUMENTS

| | | | |
|---|---|---|---|
| 8,517,132 | B2 | 8/2013 | Heichal et al. |
| 8,573,335 | B2 | 11/2013 | Rudakevych |
| 8,868,235 | B2 | 10/2014 | Zhao et al. |
| 8,869,384 | B2 | 10/2014 | Park et al. |
| 9,016,417 | B2 | 4/2015 | Ohgitani et al. |
| 9,216,718 | B2 | 12/2015 | Ojima et al. |
| 9,868,421 | B2 | 1/2018 | Hassounah |
| 2004/0093650 | A1 | 5/2004 | Martins et al. |
| 2008/0294283 | A1 | 11/2008 | Ligrano |
| 2009/0058355 | A1 | 3/2009 | Meyer |
| 2011/0112710 | A1 | 5/2011 | Meyer-Ebeling et al. |
| 2011/0113609 | A1 | 5/2011 | Berdelle-Hilge et al. |
| 2011/0223459 | A1 | 9/2011 | Heichal |
| 2012/0009804 | A1 | 1/2012 | Heichal et al. |
| 2012/0068664 | A1 | 3/2012 | Franzen et al. |
| 2012/0158229 | A1 | 6/2012 | Schaefer |
| 2013/0076902 | A1 | 3/2013 | Gao et al. |
| 2013/0221916 | A1 | 8/2013 | Kelty et al. |
| 2013/0226345 | A1 | 8/2013 | Zhao et al. |
| 2014/0175873 | A1 | 6/2014 | Kishimoto et al. |
| 2014/0369798 | A1 | 12/2014 | Escande et al. |
| 2015/0044518 | A1 | 2/2015 | Scheucher |
| 2015/0151723 | A1 | 6/2015 | Yang et al. |
| 2016/0137093 | A1 | 5/2016 | Shrinkle |
| 2016/0209226 | A1 | 7/2016 | Nagy et al. |
| 2016/0369826 | A1 | 12/2016 | Hassounah et al. |
| 2017/0225662 | A1 | 8/2017 | Newman et al. |
| 2017/0355354 | A1 | 12/2017 | Hassounah |
| 2019/0051947 | A1 | 2/2019 | Scheucher |
| 2019/0081502 | A1 | 3/2019 | Botts et al. |
| 2020/0206909 | A1 | 7/2020 | Goncalves et al. |
| 2020/0353838 | A1 | 11/2020 | Zhang et al. |
| 2020/0406780 | A1 | 12/2020 | Hassounah |
| 2022/0203854 | A1 | 6/2022 | Yu |

FOREIGN PATENT DOCUMENTS

| | | | | |
|---|---|---|---|---|
| CN | 212751289 | U | | 3/2021 |
| CN | 112644604 | A | | 4/2021 |
| CN | 213416143 | U | * | 6/2021 |
| CN | 113306446 | A | | 8/2021 |
| CN | 215361026 | U | * | 12/2021 |
| CN | 114590165 | A | | 6/2022 |
| CN | 115848321 | A | | 3/2023 |
| CN | 116163567 | A | * | 5/2023 |
| EP | 2463162 | B1 | | 3/2016 |
| EP | 3490095 | A1 | | 5/2019 |
| WO | 2011012601 | A2 | | 2/2011 |
| WO | 2019047475 | A1 | | 3/2019 |
| WO | 2019085309 | A1 | | 5/2019 |
| WO | 2020263225 | A1 | | 12/2020 |
| WO | 2021148023 | A1 | | 7/2021 |
| WO | 2022064230 | A1 | | 3/2022 |
| WO | 2022263936 | A1 | | 12/2022 |

OTHER PUBLICATIONS

ISA, International Search Report for PCT/US2024/028269, Oct. 11, 2024.

ISA, International Search Report for PCT/US2024/028273, Oct. 11, 2024.

ISA, International Search Report for PCT/US20/40070, Nov. 17, 2020.

ISA, International Search Report for PCT/US2022/071461, Jul. 22, 2022.

Industrial Property Magazine, Preliminary Examination Report for BR112021025914-7, Apr. 30, 2024.

ISA, Invitation to Pay Additional Fees for PCT/US2024/028269, Aug. 6, 2024.

ISA, Invitation to Pay Additional Fees for PCT/US2024/028273, Aug. 5, 2024.

ISA, International Search Report for PCT/US24/29678, Aug. 30, 2024.

* cited by examiner

CONFIGURABLE VEHICLE LIFT AND SERVICE STATION

TECHNICAL FIELD

This application relates generally to vehicle lifts.

BACKGROUND

Electric vehicles have limited range and battery life and periodically need additional electrical energy. When the electric-vehicle batteries are low or depleted, they are traditionally recharged by physically coupling an electrical charger to a charge port on the vehicle. Even with rapid charging, it takes at least 30 minutes to partially recharge the batteries. Another approach is to exchange the depleted batteries with charged batteries. Battery swapping can be performed in minutes, but additional infrastructure and technology are needed.

SUMMARY

Example embodiments described herein have innovative features, no single one of which is indispensable or solely responsible for their desirable attributes. The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Without limiting the scope of the claims, some of the advantageous features will now be summarized. Other objects, advantages and novel features of the disclosure will be set forth in the following detailed description of the disclosure when considered in conjunction with the drawings, which are intended to illustrate, not limit, the invention.

An aspect of the invention is directed to a vehicle lift comprising a platform having an adjustable length according to a wheelbase of the vehicle, the length measured with respect to a first axis; a plurality of clamps mounted on the platform, each clamp having an adjustable lateral position with respect to a width of the platform to mechanically engage a respective tire of the vehicle when the vehicle is located on the platform, the width measured with respect to a second axis that is orthogonal to the first axis; and a plurality of motorized lifts located below the platform, each lift mechanically coupled to a respective clamp, each motorized lift having an adjustable height to raise and lower the platform, the height measured with respect to a third axis that is orthogonal to the first and second axes, each motorized lift moveable with respect to the first axis to vary the adjustable length of the platform and with respect to the second axis to adjust the lateral position of the respective clamp, wherein when the platform is in a raised position, a service cavity is defined between the platform and a floor to receive a service robot.

In one or more embodiments, the platform includes a first set of wheel-support plates that extend along the width of the platform and that are configured to mechanically support a front set of wheels of the vehicle; a second set of wheel-support plates that extend along the width of the platform and that are configured to mechanically support a rear set of wheels of the vehicle; a first bridge attached to the first and second sets of wheel-support plates on a first side of the platform; and a second bridge attached to the first and second sets of wheel-support plates on a second side of the platform, wherein the clamps are mounted on the first and second sets of wheel-support plates, and the first and second bridges and the first and second sets of wheel-support plates define a service hole that is configured to be aligned with an underbody of the vehicle.

In one or more embodiments, the first and second bridges include a plurality of bridge plates, the bridge plates in each of the first and second bridges are configured to slidably engage one another such that when the platform is in a contracted state, the segmented plates overlap each other in a stacked configuration to reduce a length of the first and second bridges, and when the platform is in an expanded state, at least some of the segmented plates partially overlap each other to increase the length of the first and second bridges compared to when the segmented plates are in the nested configuration.

In one or more embodiments, the vehicle lift further comprises a first motor mechanically coupled to the first set of wheel-support plates, the first motor configured to translate the first set of wheel-support plates and a first pair of motorized lifts with respect to the first axis; and a second motor mechanically coupled to the second set of wheel-support plates, the second motor configured to translate the second set of wheel-support plates and a second pair of motorized lifts with respect to the first axis, whereby the first and second motors adjust the length of the platform.

In one or more embodiments, the vehicle lift further comprises a controller in electrical communication with the first and second motors, the controller configured to send control signals to the first and second motors to set the length of the platform based on the wheelbase of the vehicle. In one or more embodiments, the length of the platform is set before the vehicle is driven onto the platform, and the vehicle lift further comprises a plurality of sensors that detect a position of the vehicle on the platform; and a processor circuit having an input coupled to an output of the sensors, the processor circuit configured to produce one or more sensory feedback signals that direct a driver of the vehicle to drive such that the tires are aligned with the clamps.

In one or more embodiments, the vehicle lift further comprises an on-ramp attached to a first end of the platform; and an off-ramp attached to a second end of the platform, the on-ramp and off-ramp including a plurality of nestable slats that are configured to slidably engage one another to vary respective lengths of the on-ramp and off-ramp with respect to the first axis. In one or more embodiments, the ramp and the platform are mechanically coupled such that the ramp is contracted when the platform is in the expanded state and the ramp is expanded when the platform is in the contracted state such that an overall length of the vehicle lift remains the same when the platform is in the expanded state and in the contracted state.

In one or more embodiments, the vehicle lift further comprises a first expandable wall attached to the on-ramp and the platform; and a second expandable wall attached to the off-ramp and the platform, the first and second expandable walls configured to expand when the when the platform is in the raised position and to contract when the platform is in a lowered position.

In one or more embodiments, the vehicle lift further comprises a plurality of floor plates mounted on a bottom of the vehicle lift, the floor plates defining a floor that covers the service hole when the platform is in a lowered position. In one or more embodiments, when the platform is in the contracted state, the floor plates overlap each other to reduce a length of the floor, and when the platform is in an expanded state, at least some of the segmented plates partially overlap each other to increase the length of floor compared to when the platform is in the contracted state.

Another aspect of the invention is directed to a ground-supported structure for powering electric vehicles, comprising an enclosure for housing a vehicle during a delivery of energy to the vehicle, the enclosure having a plurality of side walls around the vehicle; and a roof above the vehicle. The ground-supported structure further comprises a platform that supports the vehicle, the platform located within the enclosure; a plurality of motorized moveable vehicle lifts configured to lift and support the platform; said motorized moveable vehicle lifts being moveable forward and backward, with respect to a first axis, to appropriate positions corresponding to wheelbase dimensions of the vehicle; said motorized moveable vehicle lifts being moveable laterally, with respect to a second axis that is orthogonal to the first axis, to appropriate positions with respect to track dimensions of the vehicle; and said motorized moveable vehicle lifts being moveable vertically to raise the platform above ground, with respect to a third axis that is orthogonal to the first and second axes, to define a service cavity for a service robot to clear and operate on an underside of the vehicle.

In one or more embodiments, the ground-supported structure further comprises an on-ramp attached to a first end of the platform; and an off-ramp attached to a second end of the platform, the on-ramp and off-ramp including a plurality of nestable slats that are configured to slidably engage one another to vary respective lengths of the on-ramp and off-ramp with respect to the first axis. In one or more embodiments, the ground-supported structure further comprises a first expandable wall attached to the on-ramp and the platform; and a second expandable wall attached to the off-ramp and the platform, the first and second expandable walls configured to expand when the when the platform is in a raised position and to contract when the platform is in a lowered position. In one or more embodiments, the ground-supported structure further comprises a set of pedestrian stairs mounted on the first or second expandable wall for human exit and/or entry.

In one or more embodiments, the platform further comprises first and second expandable bridges, the first and second expandable bridges including a plurality of nestable bridge plates; and a service hole defined between the first and second expandable bridges, the service hole aligned with the underside of the vehicle when the vehicle is on the platform. In one or more embodiments, the ground-supported structure further comprises an expandable floor mounted below the platform and aligned with the service hole so as to at least partially cover the service hole when the platform is in a lowered position, the expandable floor including a plurality of nestable floor plates.

In one or more embodiments, the ground-supported structure further comprises a plurality of sensors that detect a position of the vehicle on the platform; and a processor circuit having an input coupled to an output of the sensors, the processor circuit configured to produce one or more sensory feedback signals that direct a driver of the vehicle to drive to a predetermined position on the platform.

In one or more embodiments, the platform further comprises a plurality of lateral pushers and rollers, the lateral pushers configured to mechanically engage respective tires of the vehicle and push the respective tires along the rollers to set a lateral position of the vehicle with respect to the second axis. In one or more embodiments, the lateral pushers comprise clamps that are configured to mechanically secure the lateral position of the vehicle while the platform is in a raised position. In one or more embodiments, the clamps are mechanically coupled to the motorized moveable vehicle lifts such that a lateral movement of each motorized moveable vehicle lift causes a respective lateral movement of a respective clamp.

Another aspect of the invention is directed to an electric-vehicle service station comprising an at least partially enclosed structure having at least one retractable door configured to receive a vehicle; one or more sidewalls; and a roof, the at least one retractable door, the one or more sidewalls, and the roof defining a service cavity. The electric-vehicle service station further comprises a ground-supported structure in the service cavity. The ground-supported structure comprises an enclosure for housing a vehicle during a delivery of energy to the vehicle, the enclosure having: a plurality of side walls around the vehicle; and a roof above the vehicle. The ground-supported structure further comprises a platform that supports the vehicle, the platform located within the enclosure; a plurality of motorized moveable vehicle lifts configured to lift and support the platform; said motorized moveable vehicle lifts being moveable forward and backward, with respect to a first axis, to appropriate positions corresponding to wheelbase dimensions of the vehicle; said motorized moveable vehicle lifts being moveable laterally, with respect to a second axis that is orthogonal to the first axis, to appropriate positions with respect to track dimensions of the vehicle; and said motorized moveable vehicle lifts being moveable vertically to raise the platform above ground, with respect to a third axis that is orthogonal to the first and second axes, to define a service cavity for a service robot to clear and operate on an underside of the vehicle.

BRIEF DESCRIPTION OF THE DRAWINGS

For a fuller understanding of the nature and advantages of the concepts disclosed herein, reference is made to the detailed description of preferred embodiments and the accompanying drawings.

DETAILED DESCRIPTION

A configurable vehicle lift for servicing vehicles such as electric vehicles during battery swapping. The vehicle lift includes a platform having an adjustable length that is sized according to the wheelbase dimensions of the vehicle being serviced. Moveable motorized lifts are located below the platform to raise the lower the platform. A first set of motorized lifts is mechanically coupled to a first end of the vehicle lift. A second set of motorized lifts is mechanically coupled to a second end of the vehicle lift. The first and second sets of motorized lifts are moveable along a first axis, towards or away from each other, to adjust the length of the platform. Each motorized lift is also moveable laterally along a second axis, orthogonal to the first axis, according to the track dimensions of the vehicle being serviced. The motorized lifts are mechanically coupled to pushers or clamps that can mechanically engage or disengage the vehicle's tires as the pushers or clamps are translated laterally with the motorized lifts.

The platform includes bridges on either side of a service hole defined in the platform. The bridges include overlapping plates that can nest or extend with the length of the platform. Extendable floor plates can be located on the floor of the vehicle lift to partially or fully cover the service hole while the platform is in the lowered position.

An on-ramp and off-ramp can be mechanically coupled to the platform. The ramps can include nestable slats that allow the lengths of the ramps to be adjustable. Expandable walls can extend between the platform and the on-ramp and between the platform and the off-ramp. Pedestrian steps can be mounted on one or both expandable walls. The steps can be accessed by humans in the vehicle by walking on the bridges.

In the raise state, the platform and the expandable walls define an enclosed service cavity in which one or more robots may operate on the underside of the vehicle, such as to swap depleted batteries in the vehicle with charged batteries.

Figure 1:
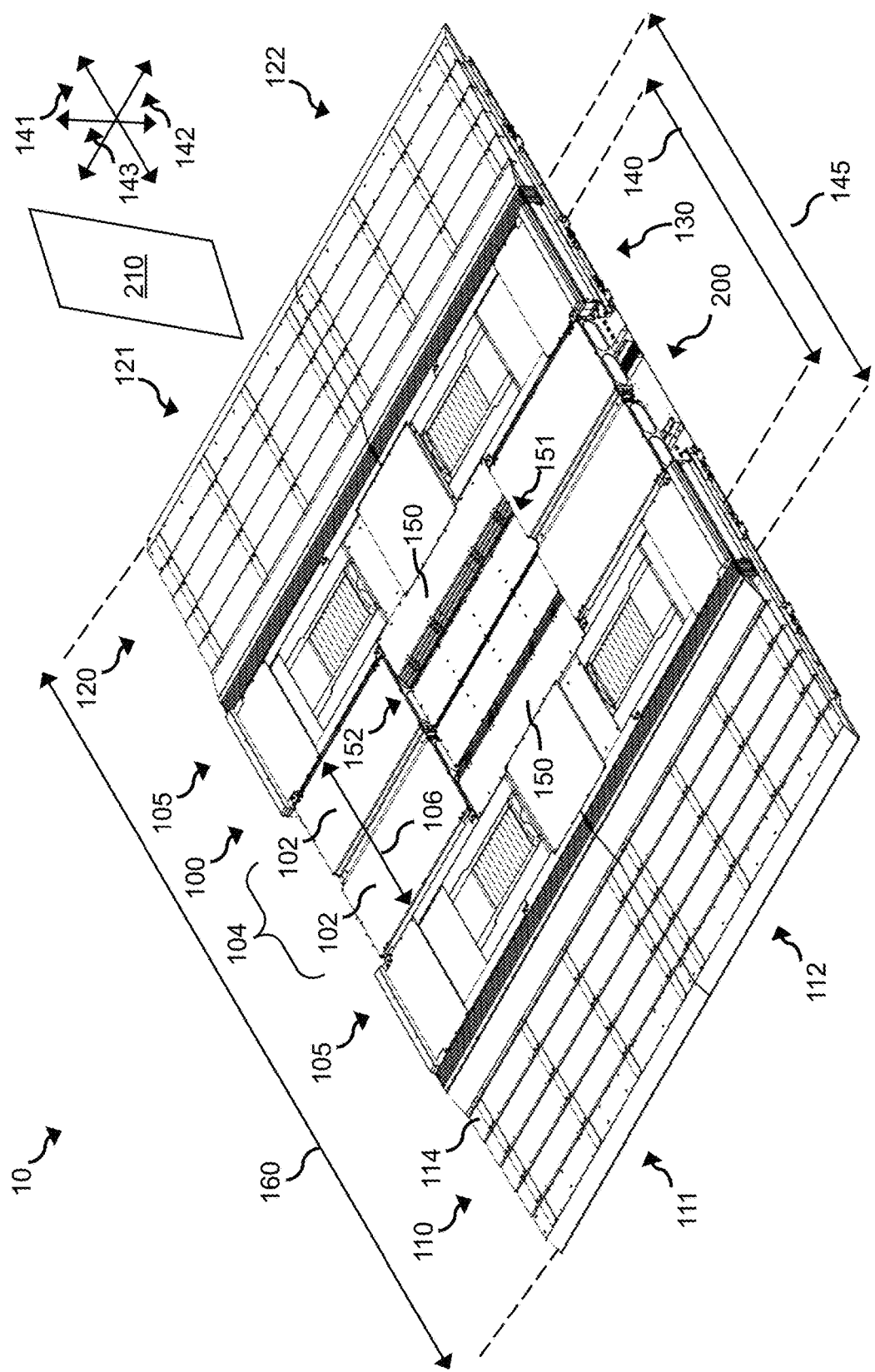
FIG. 1 is an isometric view of a vehicle lift in a lowered and contracted state according to an embodiment.

FIG. 1 is an isometric view of a vehicle lift 10 in a lowered and contracted state according to an embodiment. The vehicle lift 10 includes a platform 100, an on-ramp 110, an off-ramp 120, and a base 130. The vehicle lift 10 is supported by and placed on the ground (e.g., pavement such as in a parking lot). For example, the base 130 is placed on the ground or another surface.

The vehicle lift 10 is preferably used to support and raise an electric vehicle while one or more robots access the underbody of the electric vehicle to exchange the electric vehicle's batteries. In other embodiments, the vehicle lift 10 can be used to support a conventional vehicle (e.g., powered by gasoline or diesel).

The platform 100 includes a plurality of wheel-support plates 105 that support each tire or set of tires of the vehicle. The length 140 between the wheel-support plates 105 is adjustable and set to the wheelbase of the vehicle. The length 140 is measured with respect to (or parallel to) a first axis 141. The length 140 can be measured with respect to the same relative location of each wheel-support plate 105, such as the middle, the front edge, or the rear edge of the wheel-support plates 105.

A plurality of floor plates 102 are located between each pair of wheel-support plates 105 along or parallel to the first axis 141. In the illustrated embodiment, two sets of floor plates 102 are located between each pair of wheel-support plates 105 along or parallel to the first axis 141. In other embodiments, there can be more than two sets (e.g., three sets, four sets, or another number of sets) or only one set of floor plates 102. Each set of floor plates 102 is in a fully-stacked configuration such that the length 140 is relatively small (e.g., the smallest) to accommodate a vehicle having a minimum wheelbase, such as a small sedan. Two or more a to vary the length 140 between the wheel-support plates 105 and the length 145 of the platform 100. The floor plates 102 form bridges 104 over which the vehicle can drive and onto which the driver and/or passengers can stand while the vehicle is being serviced (e.g., batteries exchanged). The length 106 of each bridge 104 sets the length 140 between the wheel-support plates 105 and the length 145 of the platform 100.

The platform 100 also includes two sets of segmented floor plates 150. Each set of floor plates 150 is configured to cover a portion of a service hole 152 when the platform is in the lowered state, for example to prevent a human from accidentally stepping into the service hole 152. The floor plates 150 remain on the floor and are not raised with the platform 100. Each set of floor plates 150 is in a fully-stacked (e.g., overlapped) or contracted configuration that minimizes the length 140 between the wheel-support plates 105 and the length 145 of the platform 100. As the lengths 140, 145 increase, two or more floor plates 102 from each set can slidably engage one another such that the two or more floor plates 102 at least partially overlap (e.g., in an extended configuration) to increase the length of the floor plates along or parallel to the first axis 141. The service hole 152 is configured to be aligned with the underbody of the vehicle when the vehicle is positioned on the platform 100.

The wheel-support plates 105 and the floor plates 102 cover and at least partially define a service cavity 200 beneath the platform 100 where one or more robots are located to service the vehicle. The size of the service cavity 200 increases when the platform 100 is raised to provide room for the robot(s). In some embodiments, the robot(s) can exchange one or more depleted batteries in an electric vehicle with one or more charged batteries.

The on-ramp 110 and off-ramp 120 allow the vehicle to drive onto and drive off of the platform 100, respectively, along or parallel to the first axis 141. The on-ramp 110 and the off-ramp 120 can be segmented and include nestable slats 114 that allow the on-ramp 110 and the off-ramp 120 to expand and contract along or parallel to the first axis 141. The on-ramp 110 and the off-ramp 120 are illustrated in an extended state.

The on-ramp 110 each can include first and second portions 111, 112 that are located adjacent to each other along or parallel to a second axis 142 that is orthogonal to the first axis 141. The first and second axes 141, 142 are orthogonal to a third axis 143 along or parallel to which the vehicle lift 10 is raised and lowered. The off-ramp 120 each include first and second portions 121, 122 that are located adjacent to each other along or parallel to the second axis 142. The first portions 111, 121 can expand and contract together. Likewise, the second portions 112, 122 can expand and contract together.

In other embodiments, the on-ramp 110 and/or the off-ramp 120 have fixed lengths with respect to the first axis 141.

In some embodiments, the slats 114 in the on-ramp 110 and the off-ramp 120 are mechanically coupled to a respective set of floor plates 102 such that the on-ramp 110 and the off-ramp 120 transition to the extended state when the length 106 of each bridge 104 is small (e.g., in a contracted state). The on-ramp 110 and the off-ramp 120 can transition to a contracted state when the length 106 of each bridge 104 is large (e.g., in an extended state). In addition, the state or configuration of the floor plates 102 can be adjusted automatically as the lengths 106, 140, 145 vary. Thus, the overall length 160 of the vehicle lift 10 can remain constant as the lengths 106, 140, 145 are varied.

Figure 2:
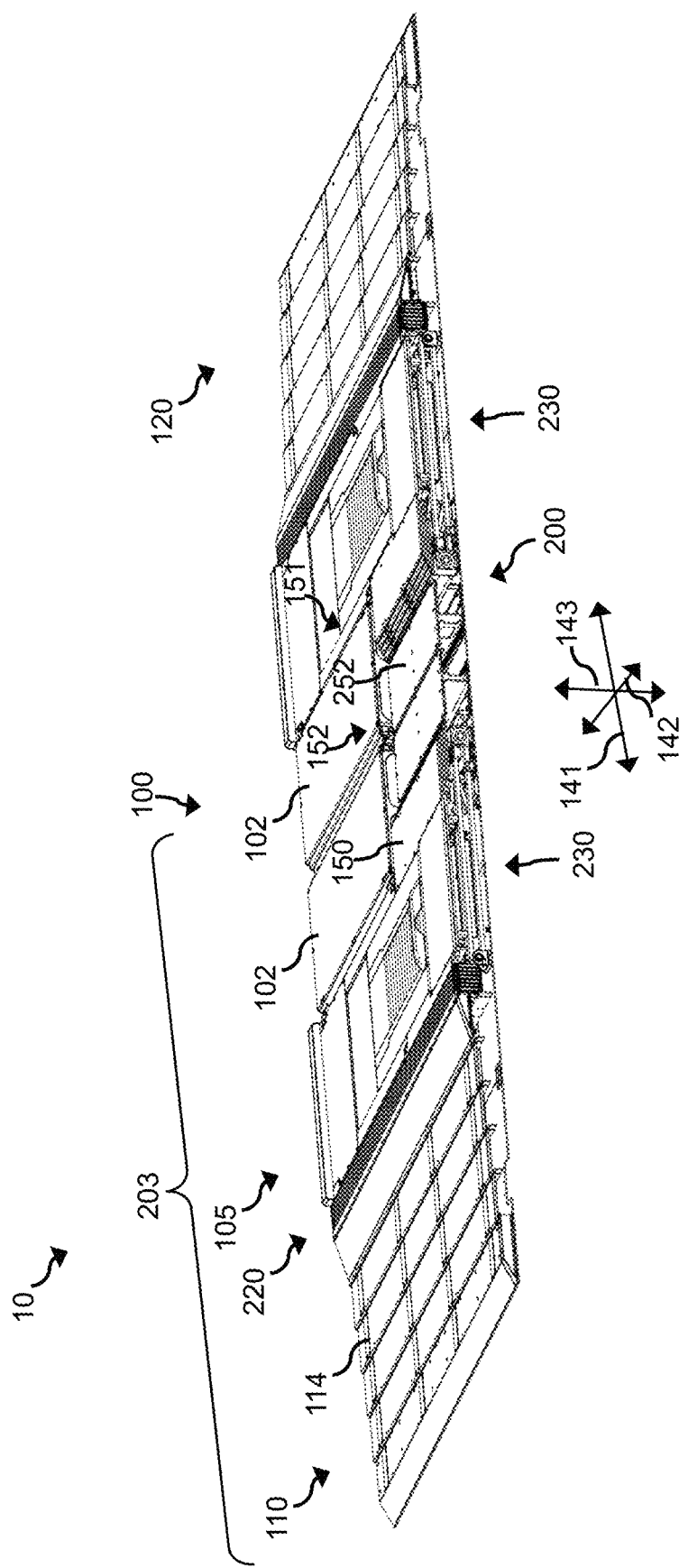
FIG. 2 is a cross section of the vehicle lift illustrated in FIG. 1.
Figure 3:
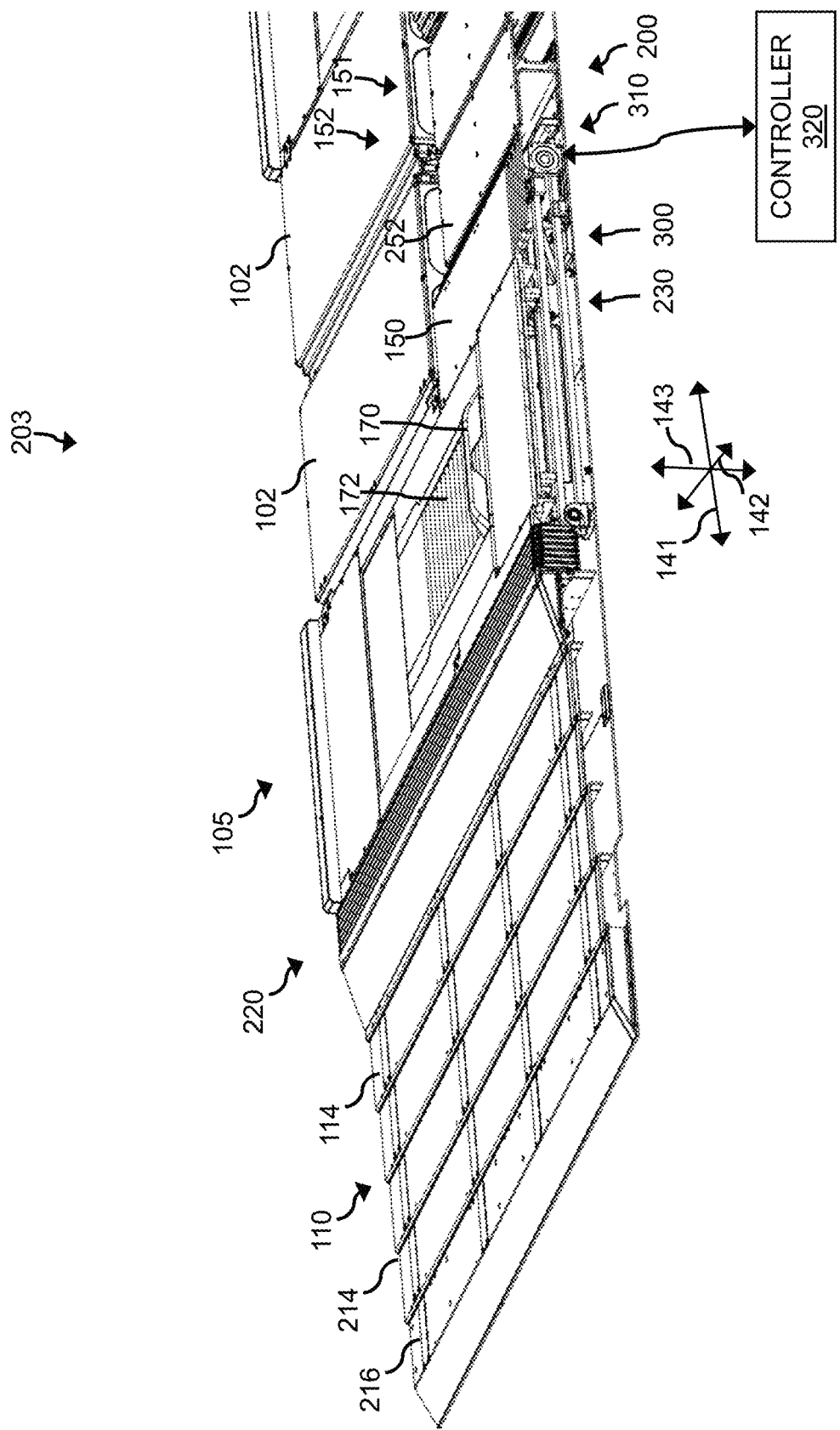
FIG. 3 is a detailed view of a portion of the vehicle lift illustrated in FIG. 2.

FIG. 2 is a cross section of the vehicle lift 10 taken through plane 210 in FIG. 1. Plane 210 is parallel to the first and third axes 141, 143. A detailed view of portion 203 is illustrated in FIG. 3. Portion 203 represents about half of the cross section; the other half of the cross section is preferably identical and symmetric to the half illustrated in FIG. 3 (e.g., as illustrated in FIG. 2).

FIGS. 2 and 3 further illustrate how the slats 114 are partially overlapped when the on-ramp 110 and the off-ramp 120 are in the extended state. In addition, these figures illustrate how the floor plates 150 are fully stacked and in a contracted configuration.

First and second chain systems 230 can be used to adjust the length of the platform 100. The chain systems 230 are mechanically coupled to the bottom of a respective pair of wheel-support plate 105 to drive the respective pair of wheel-support plate 105 forward and backward, along or parallel to the first axis 141, in a slot 300 in each wheel-support plate 105. Each chain system 230 is driven by a respective motor 310. The motors 310 can be in electrical communication with a controller 320 that sends control signals to the motors 310 to automatically set the length of the platform 100 according to the wheelbase of the vehicle to be serviced. One chain system 230 drives the rear pair of wheel-support plate 105 that support the rear wheels of the vehicle. The other chain system 230 drives the front pair of wheel-support plate 105 that support the front wheels of the vehicle.

The length of the floor 151 and the length of the bridges 104 automatically increase as the wheel-support plates 105 are moved away from each other with respect to the first axis and automatically decrease as the wheel-support plates 105 are moved towards each other with respect to the first axis.

An expandable wall 220 is located between, and can mechanically engage, each ramp 110, 120 and the front and back pairs of wheel-support plates 105, respectively. The expandable wall 220 is segmented and configured to cover and at least partially define the service cavity 200 when the vehicle lift 10 is raised. The expandable walls 220 are illustrated in a lowered or contracted state.

A clamp 170 and a set of rollers 172 are located on each wheel-support plate 105. The clamp 170 is moveable along or parallel to the second axis 142 to mechanically engage the inside of each tire of the vehicle. The clamps 170 are illustrated in an unclamped state in which the clamps 170 are positioned close to the center of the vehicle lift 10. When the clamps 170 are moved outwardly from the center of the vehicle lift 10 to mechanically engage (e.g., push) the tires, the tires can slidably engage the rollers 172 to correct any offset in the position of the vehicle relative to the platform with respect to the second axis 142. The rollers 172 are oriented parallel to one another and to the first axis 141 such that the rollers rotate about the first axis 141. The clamps 170 can be or include mechanical pushers.

The ramp 110 includes one or more ground plates or slats 216 (FIG. 3) that contacts the ground and is located at the front of the ramp 110 and away from the platform 100. The first slat 214 of the slats 114 on the ramp 110 can be rigidly attached to the ground plate(s) 216. The other slats 114 can be attached to the first slat 214 such as by scissor mechanisms that can allow the slats 114 to slide with respect to one another. The ground plate(s) 216 can be rigidly connected to the rear wheel-support plates 105 and/or to the rear lifting assemblies (e.g., lifting assembly 1100 (FIGS. 11, 12)) such that the ground plates 216 are moved inward or outward, towards or away from the platform 100 with the rear wheel-supp ground plates 216 are moved inward or outward, the slats 114 slide together or apart to contact or expand, respectively, the ramp 110.

Figure 11:
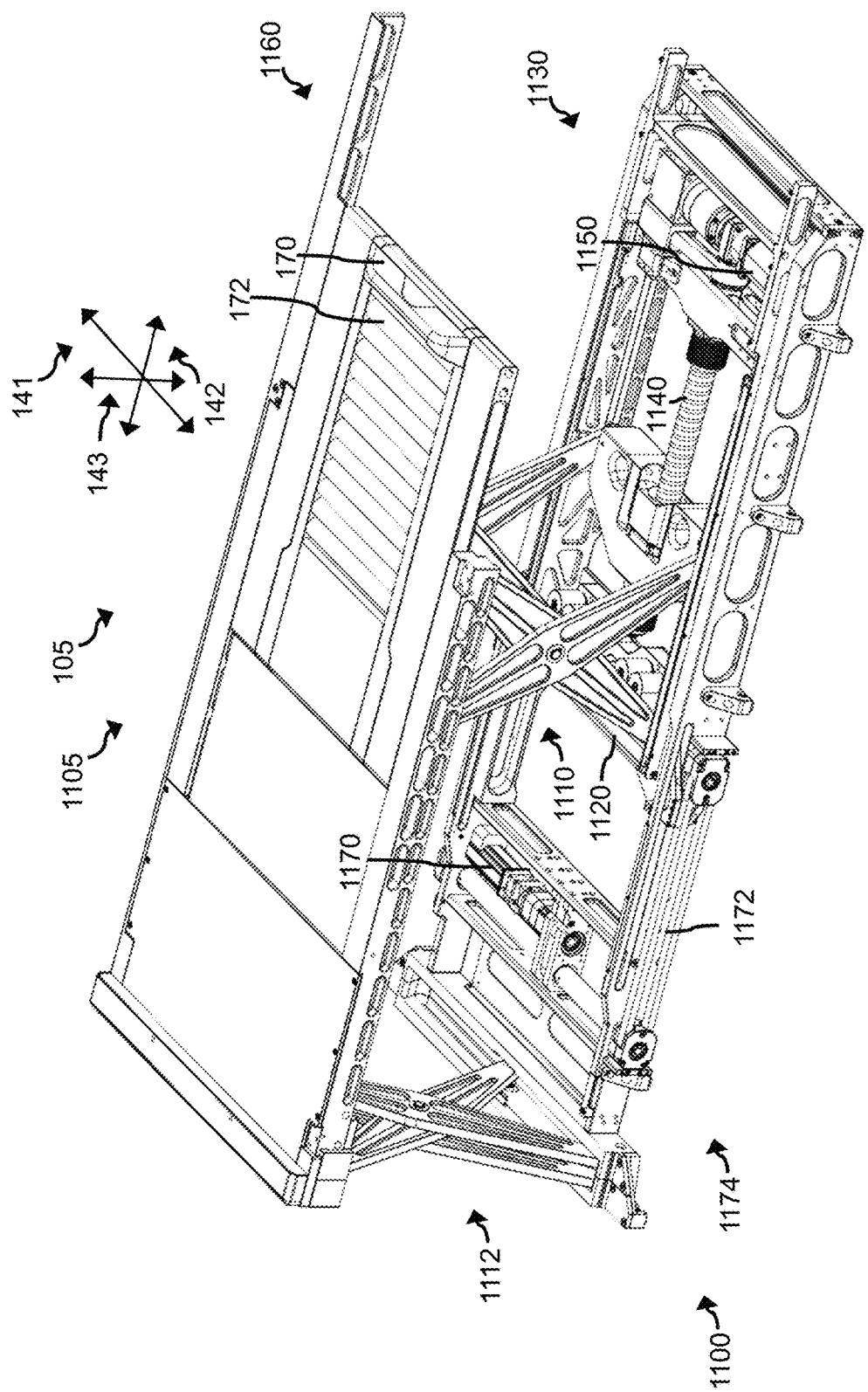
FIGS. 11 and 12 are isometric and isolated view of a lifting assembly according to an embodiment.
Figure 12:
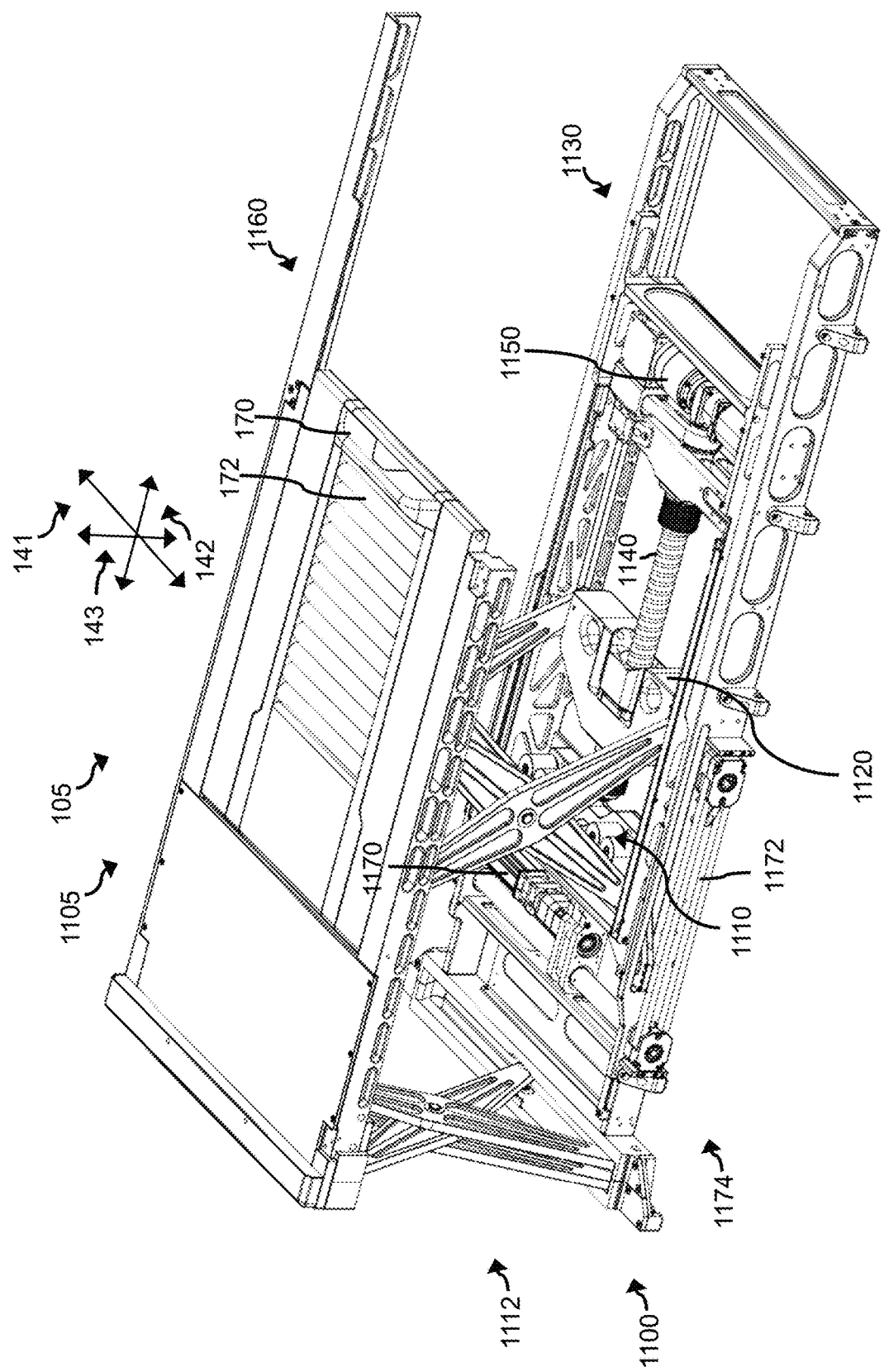

Ramp 120 can be the same as ramp 110 except that the ground plate(s) of ramp 120 can be rigidly attached to the front wheel-support plates 105 and/or to the front lifting assemblies (e.g., lifting assembly 1100 (FIGS. 11, 12).

The cross section also reveals rails 252 in the service cavity 152 that can be used to mount one or more service robots. The floor plates 150 do not extend over the rails 252 which are used by the service robot(s) when the platform 100 is raised. In addition, the rails 252 cover the service hole 152 when the platform 100 is lowered. Thus, the rails 252 and the floor plates 150 can define a floor 151 that covers the service cavity 152 when the platform 100 is lowered.

Figure 4:
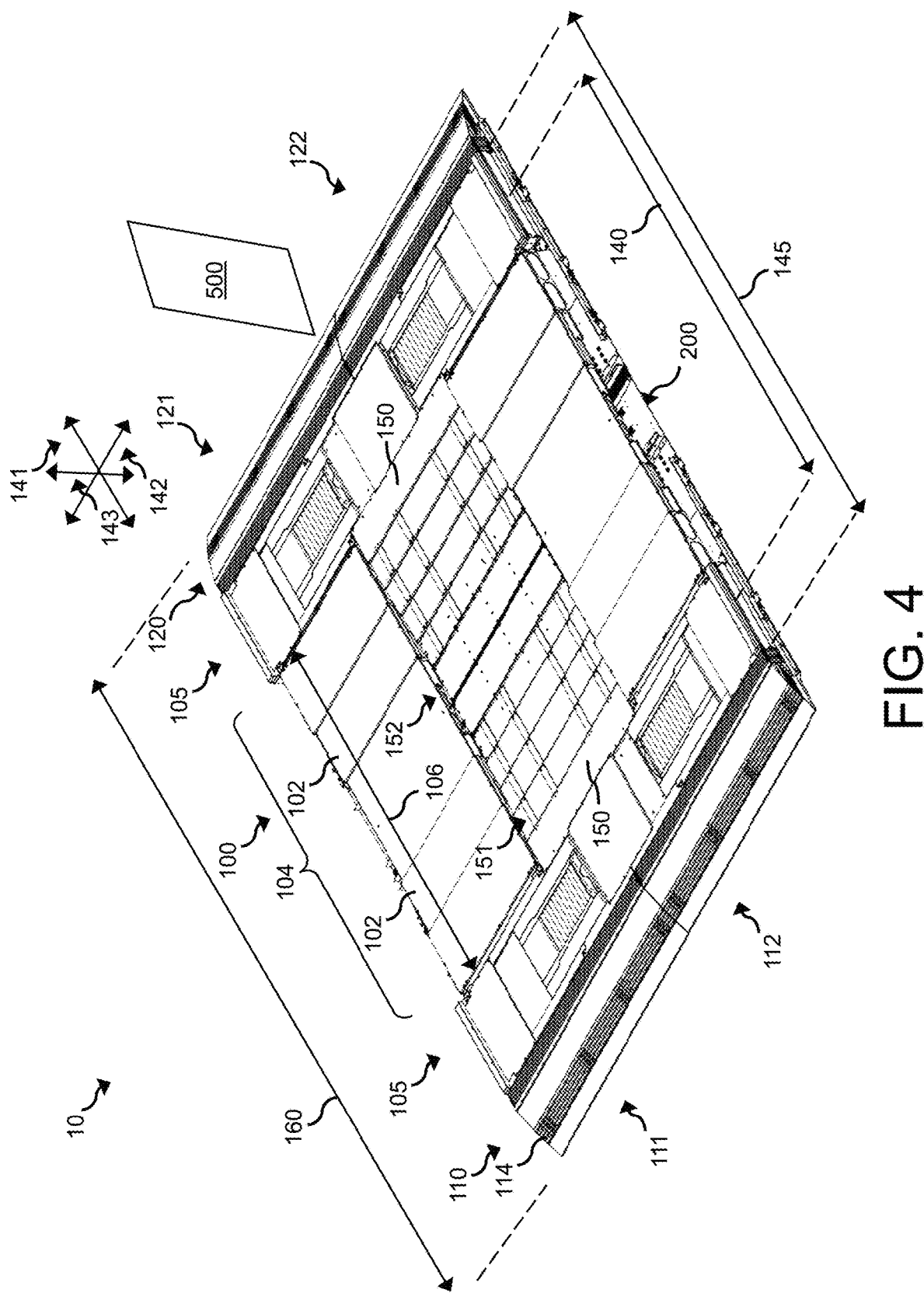
FIG. 4 is an isometric view of the vehicle lift illustrated in FIG. 1 in a lowered and extended state according to an embodiment.

FIG. 4 is an isometric view of the vehicle lift 10 in a lowered and extended state according to an embodiment. When the vehicle lift 10 in the extended state, the lengths 106, 140, and 145 are larger, compared to the contracted state, while the overall length 160 remains the same. In addition, the service hole 152 is longer, with respect to the first axis 141, when the vehicle lift 10 is in the extended state compared to when the vehicle lift 10 is in the contracted state. The floor plates 102 from each set are partially overlapped to increase the length 106 of the bridge 104. In addition, the floor plates 150 are partially overlapped to extend the floor 151 cover the longer service hole 152. The floor plates 150 can slidably engage one another to extend or contract the floor 151. The floor plates 102 and the wheel-support plates 105 continue to cover and at least partially define the service cavity 200 which has increased in size, relative to the first axis 141, when the vehicle lift 10 is in the extended state compared to the contracted state.

The ramps 110, 120 are in a contracted state in which the slats 114 are mostly or fully overlapped (e.g., more overlapped than when the ramps 110, 120 are in the extended state).

Figure 5:
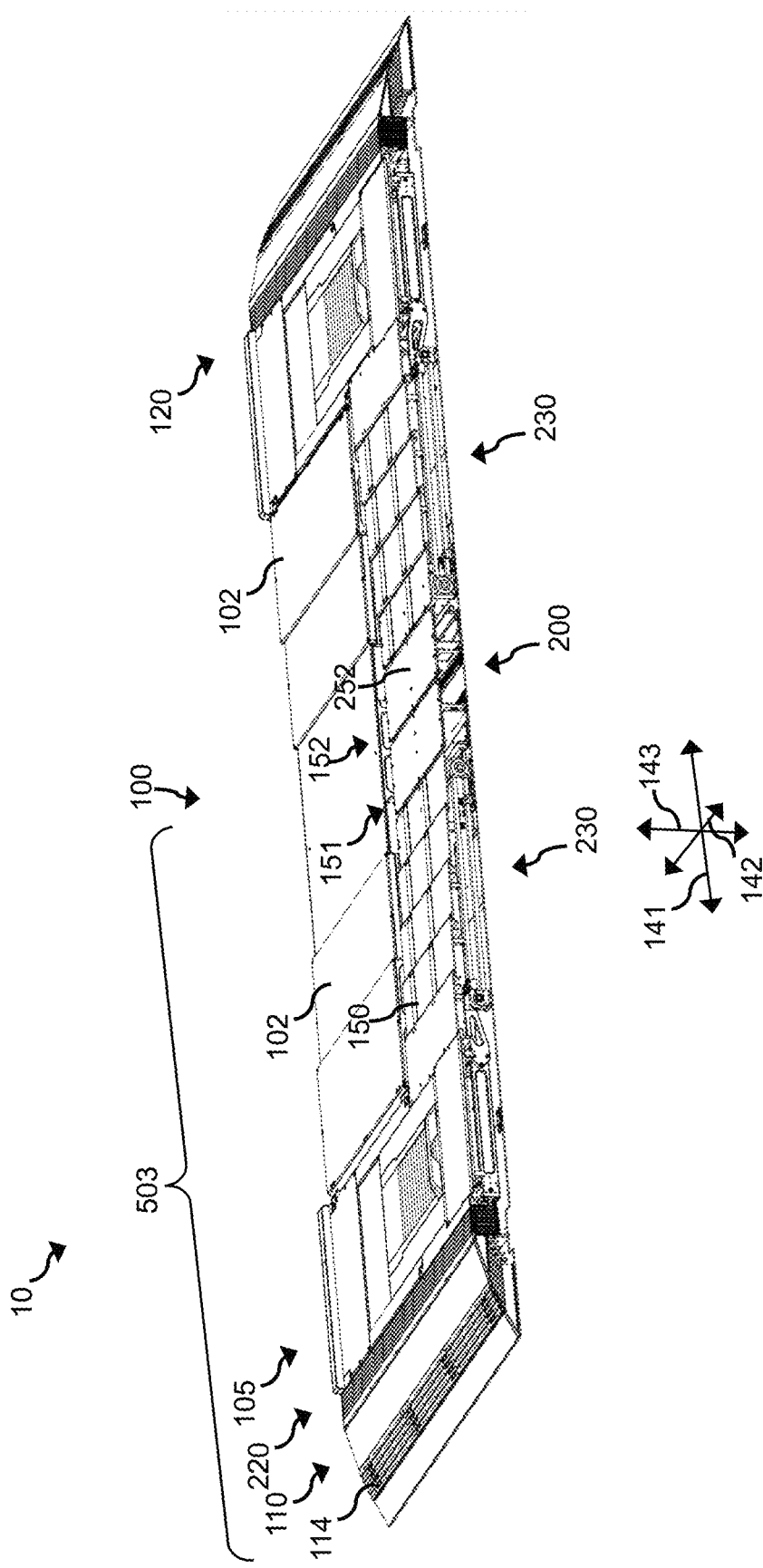
FIG. 5 is a cross section of the vehicle lift illustrated in FIG. 4.
Figure 6:
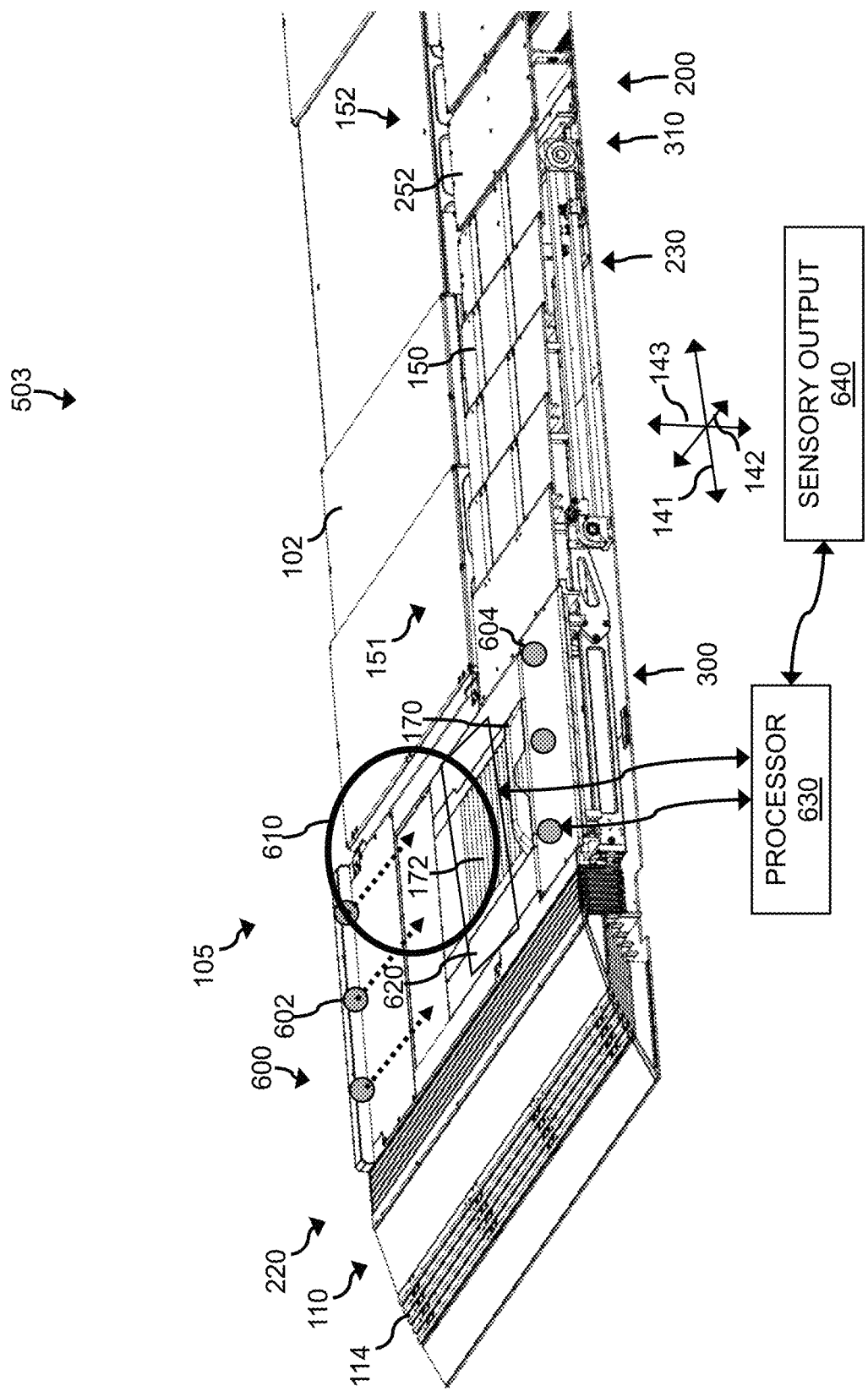
FIG. 6 is a detailed view of a portion of the vehicle lift illustrated in FIG. 5.

FIG. 5 is a cross section of the vehicle lift 10 taken through plane 500 in FIG. 4. Plane 500 is parallel to the first and third axes 141, 143. A detailed view of portion 503 is illustrated in FIG. 6. Portion 503 represents about half of the cross section; the other half of the cross section is preferably identical and symmetric to the half illustrated in FIG. 6 (e.g., as illustrated in FIG. 5).

FIG. 6 illustrates an example of position sensors 600 that can be used to sense the position of a vehicle on the platform 100 to confirm that the vehicle is the correct position. The illustrated position sensors 600 include a plurality of light emitters 602 that direct light across the platform 100 along or parallel to the second axis 142 and a plurality of light detectors 604 that sense the light emitted by the respective light emitters 602. As the vehicle drives onto the platform 100, the vehicle's tire 610 blocks the light from one or more the light emitters 602. The position of the tire 610 is determined based on which light emitter(s) 602 is/are blocked (e.g., which light detector(s) 604 do not detect light). The light produced by the light emitters 602 can be collimated such as laser light. The position sensors 600 can be mounted on one, some or all of the wheel-support plates 105.

In addition or in the alternative, the reference number 602 can represent a camera that optically detect the position the tire 610. In addition or in the alternative, one or more pressure and/or weight sensors 620 can be placed on the wheel-support plates 105 to detect the position of the tires 610.

The sensors 600 and/or 620 can be in electrical communication with a processor circuit 630 that can be configured to determine the position of the tire(s) based on the output signals from the sensors 600 and/or 620. The processor circuit 630 can produce one or more output control signals to a sensory output device 640 that can provide sensory feedback to the driver to position the vehicle correctly with respect to the first axis 141. The sensory output device 640 can include a plurality of lights that represent forward, backward, and stop. Additionally or alternatively, the sensory output device 640 can include text or graphics, such as an overlay that represents the vehicle in its current position on the platform 100 and arrows or other graphics that represent the direction to move the vehicle when the vehicle is not positioned in the correct location. Additionally or alternatively, the sensory output device 640 can also produce audio signals that can guide the driver or vehicle.

The preferred position is for the vehicle's tires to be aligned with and centered with respect to the clamps 170.

Figure 7:
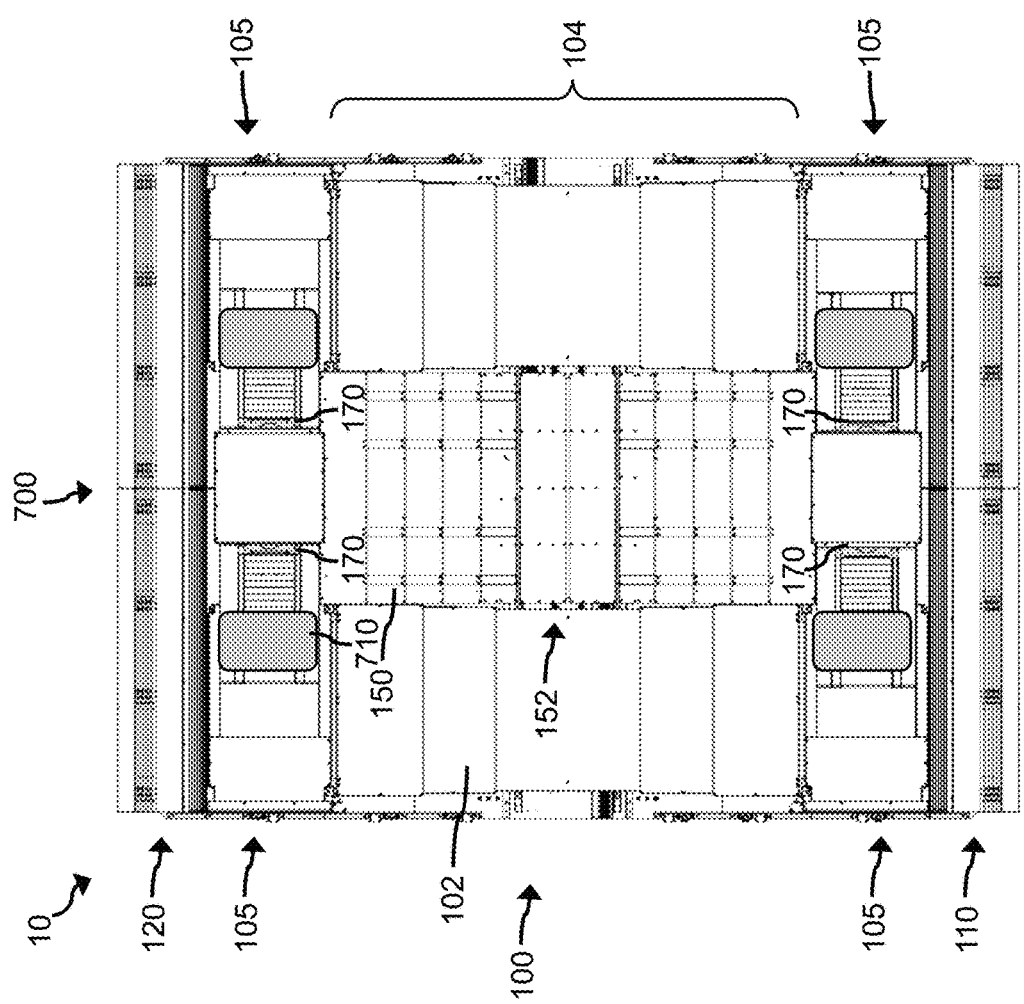
FIG. 7 is a top view of the vehicle lift illustrated in FIG. 1 in the lowered and extended state where the clamps are in an unclamped state.
Figure 8:
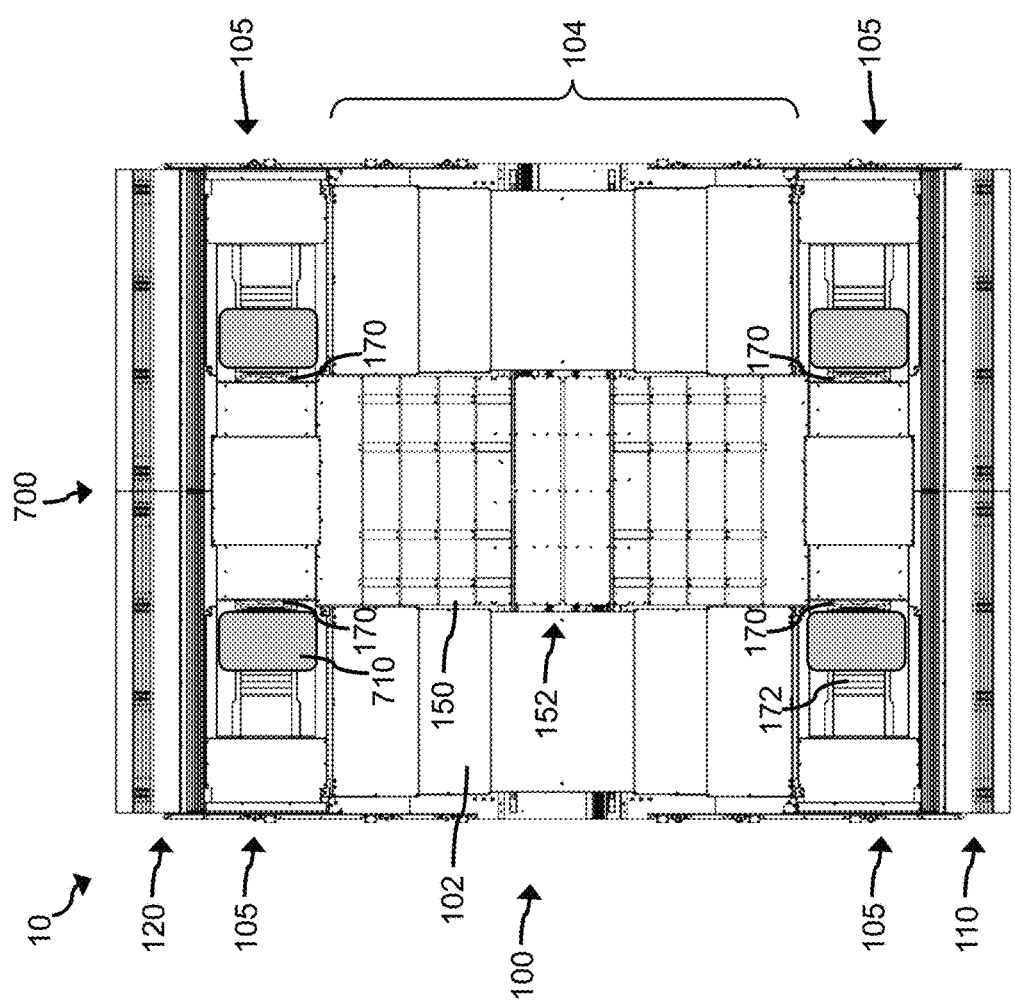
FIG. 8 is a top view of the vehicle lift illustrated in FIG. 1 in the lowered and extended state where the clamps are in a clamped state.

FIGS. 7 and 8 are top views of the vehicle lift 10 in the lowered and extended state to further illustrate the movement of the clamps 170. The clamps 170 are in an unclamped state in FIG. 7 and in a clamped state in FIG. 8. In the unclamped state, the clamps 170 are located closer to the center 700 of the vehicle lift 10 than when the clamps 170 are in the clamped state. In the clamped state, the clamps 170 move outwardly and parallel to the second axis to mechanically engage the inside of the tires 710 of a vehicle. The tires 710 can slide across the rollers 172 as the clamps 170 move outwardly. The position of the clamps 170 in FIG. 8 can represent a fully clamped position which can be the furthest that the clamps 170 are configured to move outwardly. In the clamped state, the clamps 170 can be located in any position between those illustrated in FIGS. 7 and 8, where the position is determined by the specifications of the vehicle.

The clamps 170 function in the same way when the vehicle lift 10 is in the contracted state as when the vehicle lift 10 is in the extended state.

Figure 9:
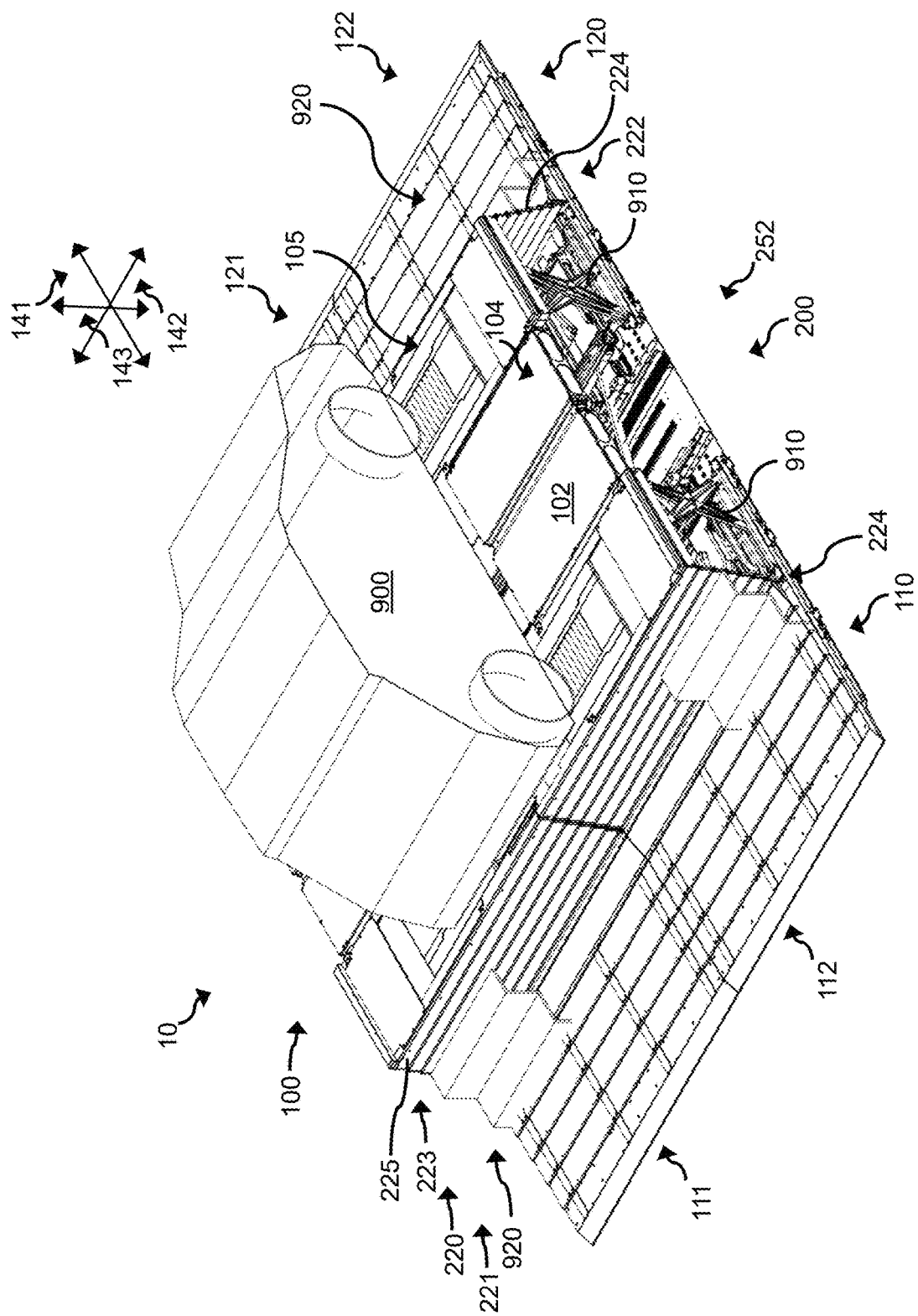
FIG. 9 is an isometric view of the vehicle lift illustrated in FIG. 1 in a raised and contracted state according to an embodiment.
Figure 10A:
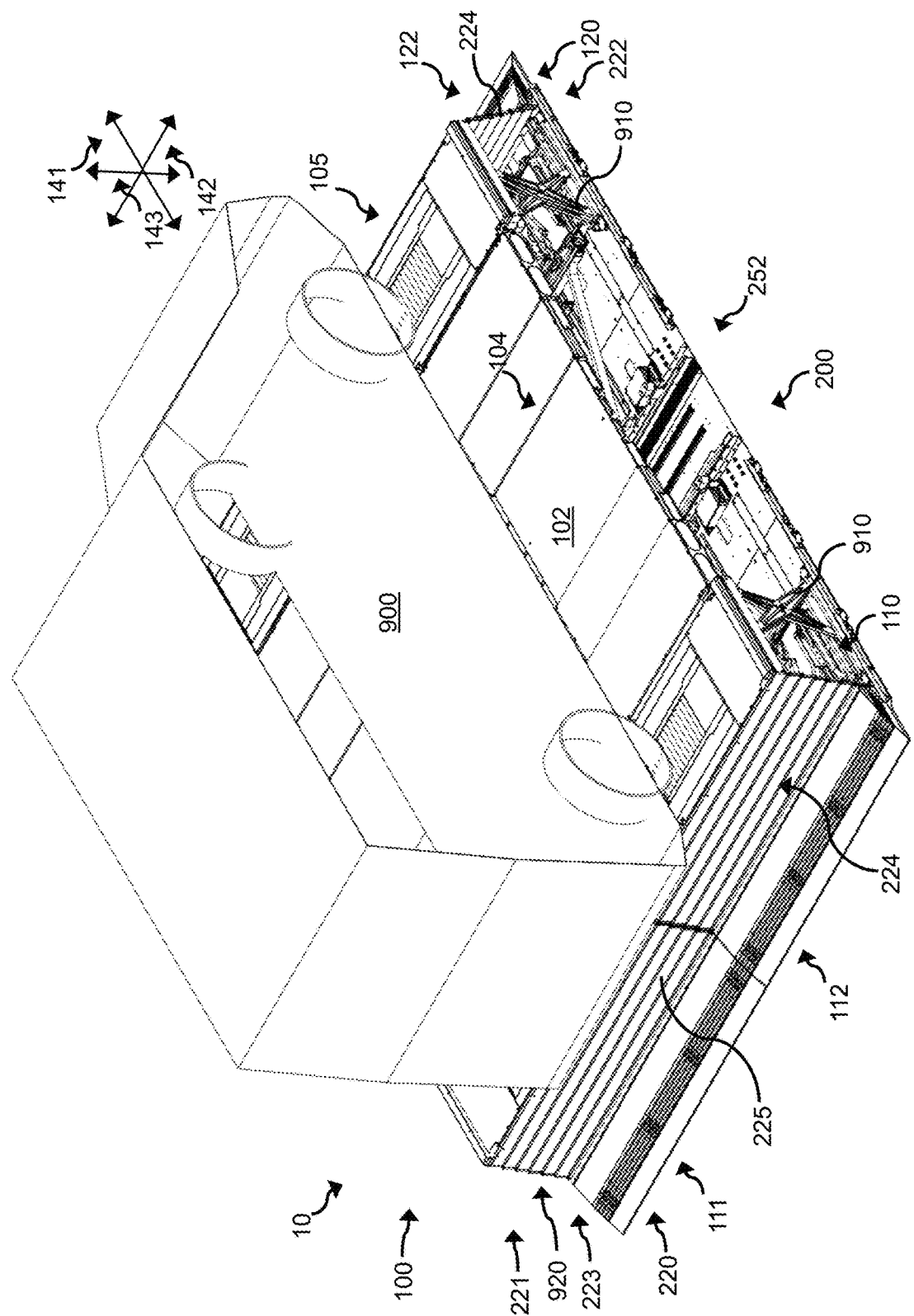
FIGS. 10A and 10B are isometric views of the vehicle lift illustrated in FIG. 1 in a raised and extended state according to an embodiment.
Figure 10B:
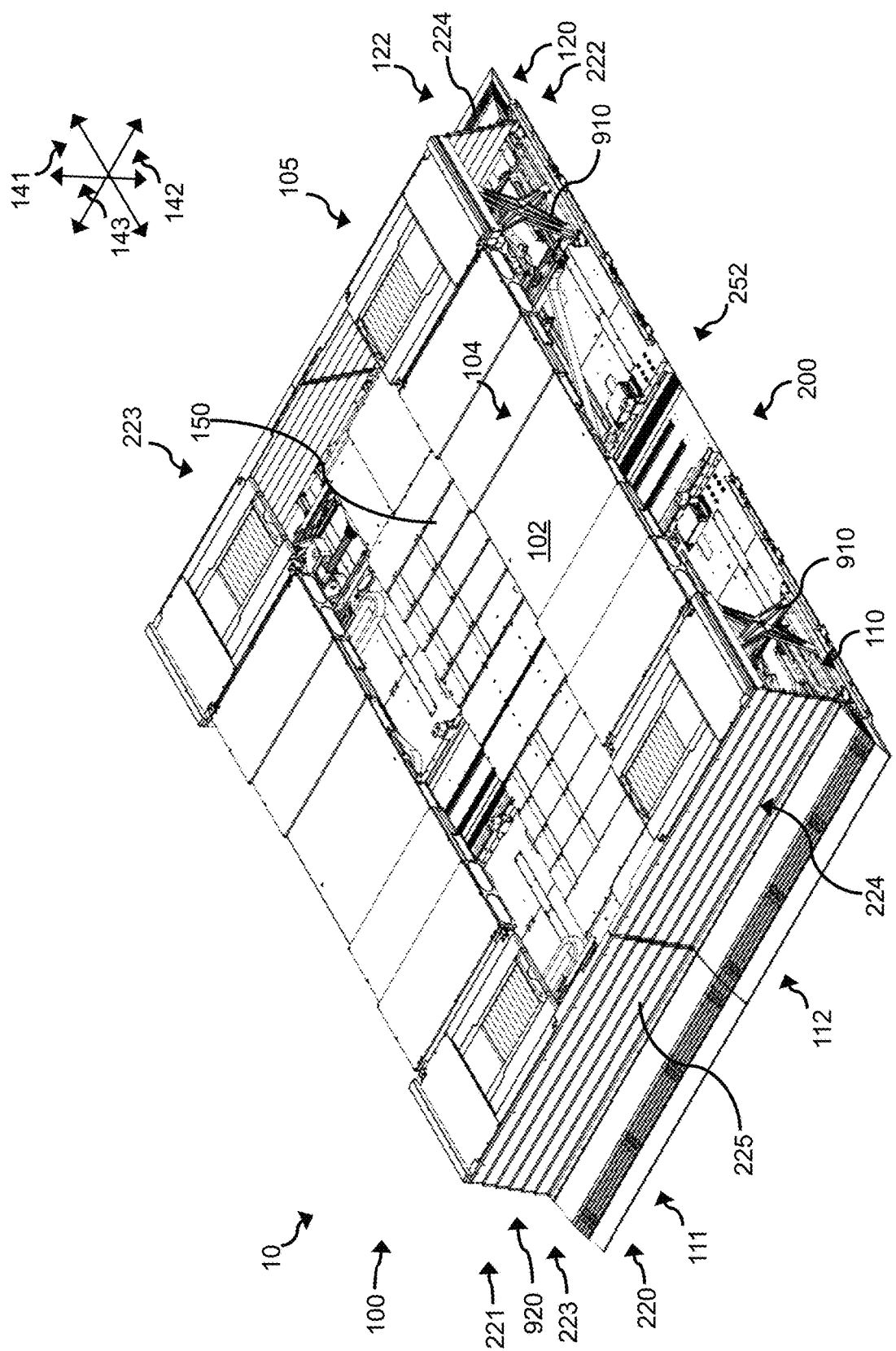

FIGS. 9 and 10A-B are isometric views of the vehicle lift 10 in the raised state. The vehicle lift 10 is in the contracted state in FIG. 9 and in the extended state in FIGS. 10A and 10B. An example vehicle 900 is located on the platform 100 in FIGS. 9 and 10A.

The vehicle lift 10 includes a plurality of (e.g., four) scissor lifts 910 that are in a lifted state to raise the platform 100 and transition the vehicle lift 10 to the raised state. When the vehicle lift 10 is in the lowered state, the scissor lifts 910 are in a lowered state and are not visible in FIGS. 1-8. Each scissor lift 910 is located below and configured to support a respective wheel-support plate 105. The scissor lifts 910 are moved with the respective wheel-support plates 105 so that the scissor lifts 910 remain below the respective wheel-support plates 105 when the vehicle lift 10 is in the contracted state, in the extended state, or in a partially extended state.

When the vehicle lift 10 in the raised state, the expandable walls 220 are in a raised or expanded state to cover and at least partially define the service cavity 200. The expandable walls 220 are segmented and includes a plurality of nestable slats 225 that are at least partially overlapped when the expandable walls 220 are in the raised state and are partially or fully overlapped or nested when the expandable walls 220 is in the lowered or contracted state.

Each expandable wall 220 can include first and second portions 223, 224. The first portion 223 of a first wall 221 is aligned with and corresponds in width with, as measured with respect to the second axis 142, the first portion 111 of the on-ramp 110. The first portion 223 extends between and mechanically engages and/or is attached to the first portion 111 of the on-ramp 110 and a respective wheel-support plate 105. The second portion 224 of the first wall 221 is aligned with and corresponds in width with, as measured with respect to the second axis 142, the second portion 112 of the on-ramp 110. The second portion 224 extends between and mechanically engages and/or is attached to the second portion 112 of the on-ramp 110 and a respective wheel-support plate 105.

The first portion 223 of a second wall 222 is aligned with and corresponds in width with, as measured with respect to the second axis 142, the first portion 121 of the off-ramp 120. The first portion 223 extends between and mechanically engages and/or is attached to the first portion 121 of the off-ramp 120 and a respective wheel-support plate 105. The second portion 224 of the second wall 222 is aligned with and corresponds in width with, as measured with respect to the second axis 142, the second portion 122 of the off-ramp 120. The second portion 224 extends between and mechanically engages and/or is attached to the second portion 122 of the off-ramp 120 and a respective wheel-support plate 105.

One or more optional sets of stairs 920 can be attached to the expandable wall 220 and the on-ramp 110 and/or the off-ramp 120. For example, a first set of stairs 920 can be attached to the first portion 223 of the first wall 221, a second set of stairs 920 can be attached to the second portion 224 of the first wall 221, a third set of stairs can be attached to the first portion 223 of the second wall 222, and/or a fourth set of stairs 920 can be attached to the second portion 224 of the second wall 222.

In FIG. 10B, the vehicle is removed to illustrate that the floor plates 150 remain at the bottom of the vehicle lift 10 when the platform 100 is raised. The floor plates 150 can be mounted to a bottom structure of the vehicle lift 10.

FIG. 11 is an isometric and isolated view of a lifting assembly 1100 according to an embodiment. The lifting assembly 1100 can be the same as the scissor lift 910. The lifting assembly 1100 includes a moveable scissor lift 1110 that is mounted on a base 1120. The scissor lift 1110 is attached to a wheel-support plate 105 to raise and lower the wheel-support plate 105 with respect to the third axis 143. The base 1120 is slidably mounted on rails 1130 that are oriented along or parallel to the second axis 142. A leadscrew 1140 is mechanically coupled to the base 1120. The leadscrew 1140 is driven by a motor 1150. When the motor 1150 is driven in a first direction (e.g., clockwise), the leadscrew 1140 advances and drives the scissor lift 1110 in upwards (e.g., along or parallel to the third axis 143). When the motor 1150 is driven in a second direction (e.g., counterclockwise), the leadscrew 1140 retracts and drives the scissor lift 1110 in upward.

The wheel-support plate 105 is slidably mounted on rails or slots 1160. A change in position of the base 1120 with respect to the second axis 142 causes a corresponding change in position of the wheel-support plate 105 with respect to the second axis 142. Thus, the position of the base 1120 can be changed to cause the clamp 170 to move towards or away from the vehicle's tire to transition the clamp 170 between the clamped and unclamped states. A motor 1170 is configured to drive the base 1120 along the rails 1160. For example, the motor 1170 can mechanically engage a trackwidth chain 1172 such as via a transfer shaft. A lift carriage 1174 that includes the base 1120, the rails 1130, the motor 1150, the clamp 170, and the rollers 172 is mechanically coupled to the trackwidth chain 1172. When the motor 1170 moves or rotates the trackwidth chain 1172, the lift carriage 1174 including the clamp 170 and roller 172 are translated laterally with respect to the second axis 142 to adjust the clamp 170 according to the trackwidth dimensions of the vehicle.

For example, in FIG. 12 the base 1120 and the wheel-support plate 105, including the clamp 170, have been moved outwardly compared to FIG. 11 such that the clamp 170 is in a clamped state in FIG. 12 and in an unclamped state in FIG. 11. The wheel-support plate 105 includes telescoping plates 1105 that allow the length of the wheel-support plate 105, with respect to the first axis 141, to vary as the wheel-support plate 105 is moved inwardly and outwardly with respect to the second axis 142.

A stationary scissor lift 1112 is positioned to support the outside of the wheel-support plate 105, such that the clamp 170 and the stationary scissor lift 1112 are on opposing ends of the wheel-support plate 105. The stationary scissor lift 1112 is oriented orthogonally with respect to the moveable scissor lift 1110. The scissors of the moveable scissor lift 1110 are oriented parallel to the second axis 142, and the scissors of the stationary scissor lift 1112 are oriented parallel to the first axis 141.

Since the moveable scissor lift 1110 is mounted under and mechanically coupled to the wheel-support plate 105, when the chain system 230 (e.g., illustrated in FIGS. 2 and 3) drives the respective wheel-support plate 105 forward and backward with respect to the first axis 141, the moveable scissor lift 1110 is also moved forward and backward with respect to the first axis 141.

Figure 13:
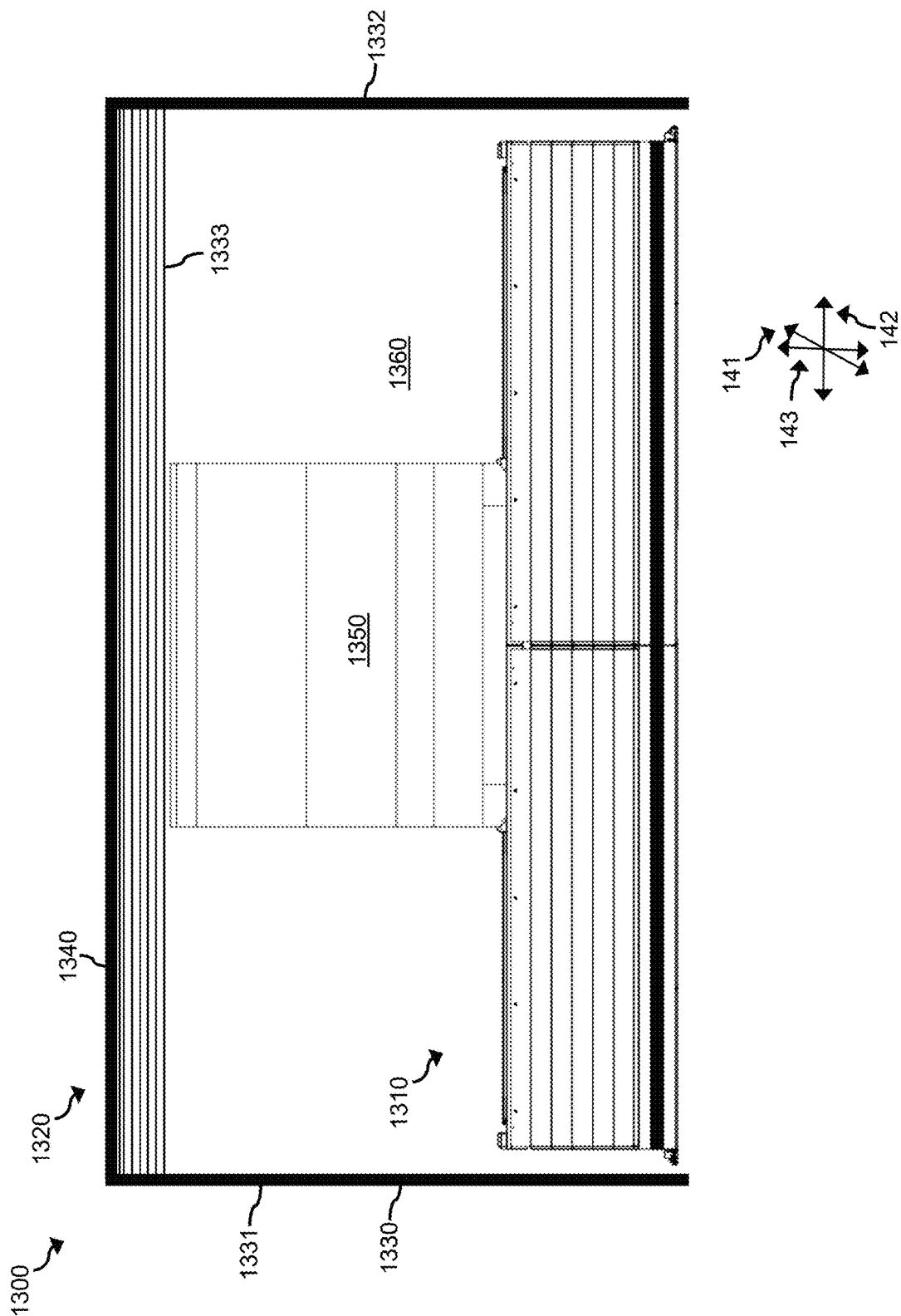
FIGS. 13 and 14 are front views of a service station according to an embodiment.

FIG. 13 is a front view of a service station 1300 according to an embodiment. The service station 1300 is preferably an electric-vehicle service station.

The service station 1300 includes a vehicle lift 1310 and an at least partially enclosed structure 1320. The vehicle lift 1310 can be the same as vehicle lift 10. The structure 1320 includes a plurality of sidewalls 1330 and a roof 1340. The sidewalls 1330 include at least first and second sidewalls 1331, 1332 that extend along the length of the vehicle lift 1310 and along or parallel to the first axis 141. The roof 1340 extends over the vehicle lift 1310 and covers the vehicle lift 1310 along its length and width (e.g., with respect to the first and second axes 141, 142, respectively). The height of the roof 1340, as measured with respect to the third axis 143, is set to allow the vehicle lift 1310 to be in a raised state while supporting a vehicle 1350 without contacting the roof 1340. The height of the roof 1340 can be configured to accommodate a wide range of vehicles including sedans, large delivery vans, and other vehicles. The roof 1340 is configured to block rain, snow, and/or debris from passing into a service cavity 1360 defined by and within the structure 1320. The roof 1340 can also block the sun to reduce the temperature in the service cavity 1360.

Figure 14:
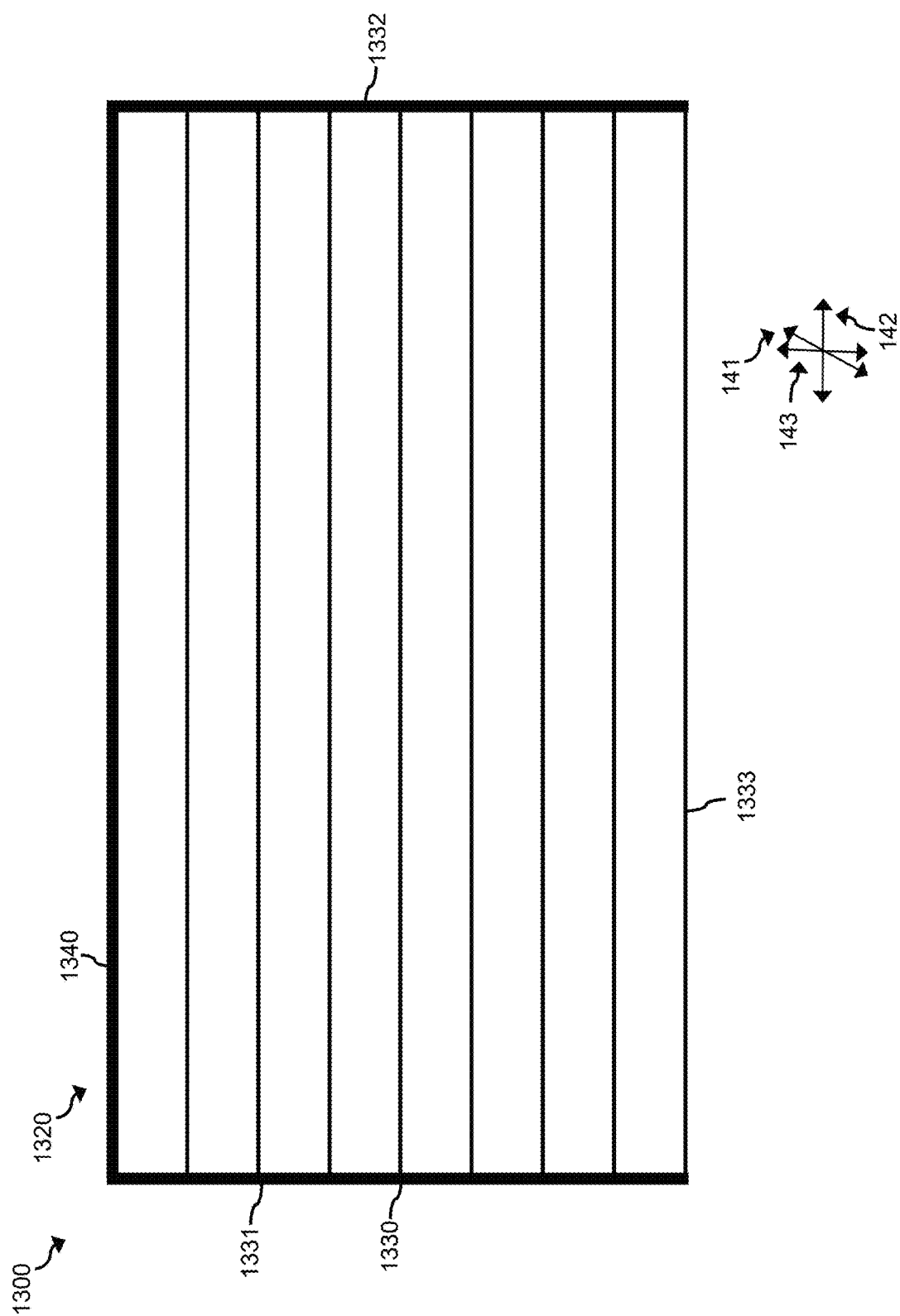

In some embodiments, the sidewalls 1330 include retractable doors 1333. The retractable doors 1333 can be opened to allow the vehicle 1350 to drive onto or off of the vehicle lift 1310. The retractable doors 1333 can be closed after the vehicle 1350 drives onto the vehicle lift 1310 or when the service station 1310 is not in use (e.g., between vehicles, when the service station 1310 is closed, etc.). The retractable doors 1333 are opened in FIG. 13 and closed in FIG. 14. The retractable door 1333 illustrated in the front views of FIGS. 13 and 14 is a front door. The other retractable door 1333, the back door, of the structure 1320 appears the same as the front door and is not illustrated for brevity.

The invention should not be considered limited to the particular embodiments described above. Various modifications, equivalent processes, as well as numerous structures to which the invention may be applicable, will be readily apparent to those skilled in the art to which the invention is directed upon review of this disclosure. The above-described embodiments may be implemented in numerous ways. One or more aspects and embodiments involving the performance of processes or methods may utilize program instructions executable by a device (e.g., a computer, a processor, or other device) to perform, or control performance of, the processes or methods.

In this respect, various inventive concepts may be embodied as a non-transitory computer readable storage medium (or multiple non-transitory computer readable storage media) (e.g., a computer memory of any suitable type including transitory or non-transitory digital storage units, circuit configurations in Field Programmable Gate Arrays or other semiconductor devices, or other tangible computer storage medium) encoded with one or more programs that, when executed on one or more computers or other processors, perform methods that implement one or more of the various embodiments described above. When implemented in software (e.g., as an app), the software code may be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a Personal Digital Assistant (PDA), a smartphone or any other suitable portable or fixed electronic device.

Also, a computer may have one or more communication devices, which may be used to interconnect the computer to one or more other devices and/or systems, such as, for example, one or more networks in any suitable form, including a local area network or a wide area network, such as an enterprise network, and intelligent network (IN) or the Internet. Such networks may be based on any suitable technology and may operate according to any suitable protocol and may include wireless networks or wired networks.

Also, a computer may have one or more input devices and/or one or more output devices. These devices can be used, among other things, to present a user interface. Examples of output devices that may be used to provide a user interface include printers or display screens for visual presentation of output and speakers or other sound generating devices for audible presentation of output. Examples of input devices that may be used for a user interface include keyboards, and pointing devices, such as mice, touch pads, and digitizing tablets. As another example, a computer may receive input information through speech recognition or in other audible formats.

The non-transitory computer readable medium or media may be transportable, such that the program or programs stored thereon may be loaded onto one or more different computers or other processors to implement various one or more of the aspects described above. In some embodiments, computer readable media may be non-transitory media.

The terms "program," "app," and "software" are used herein in a generic sense to refer to any type of computer code or set of computer-executable instructions that may be employed to program a computer or other processor to implement various aspects as described above. Additionally, it should be appreciated that, according to one aspect, one or more computer programs that when executed perform methods of this application need not reside on a single computer or processor but may be distributed in a modular fashion among a number of different computers or processors to implement various aspects of this application.

Computer-executable instructions may be in many forms, such as program modules, executed by one or more computers or other devices. Generally, program modules include routines, programs, objects, components, data structures, etc. that performs particular tasks or implement particular abstract data types. The functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Thus, the disclosure and claims include new and novel improvements to existing methods and technologies, which were not previously known nor implemented to achieve the useful results described above. Users of the method and system will reap tangible benefits from the functions now made possible on account of the specific modifications described herein causing the effects in the system and its outputs to its users. It is expected that significantly improved operations can be achieved upon implementation of the claimed invention, using the technical components recited herein.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

What is claimed is:

1. A vehicle lift comprising:
a platform having an adjustable length according to a wheelbase of the vehicle, the length measured with respect to a first axis;
a plurality of clamps mounted on the platform, each clamp having an adjustable lateral position with respect to a width of the platform to mechanically engage a respective tire of the vehicle when the vehicle is located on the platform, the width measured with respect to a second axis that is orthogonal to the first axis; and
a plurality of motorized lifts located below the platform, each lift mechanically coupled to a respective clamp, each motorized lift having an adjustable height to raise and lower the platform, the height measured with respect to a third axis that is orthogonal to the first and second axes, each motorized lift moveable with respect to the first axis to vary the adjustable length of the platform and with respect to the second axis to adjust the lateral position of the respective clamp;
wherein when the platform is in a raised position, a service cavity is defined between the platform and a floor to receive a service robot.

2. The vehicle lift of claim 1, wherein the platform includes:
a first set of wheel-support plates that extend along the width of the platform and that are configured to mechanically support a front set of wheels of the vehicle;
a second set of wheel-support plates that extend along the width of the platform and that are configured to mechanically support a rear set of wheels of the vehicle;
a first bridge attached to the first and second sets of wheel-support plates on a first side of the platform; and
a second bridge attached to the first and second sets of wheel-support plates on a second side of the platform,
wherein:
the clamps are mounted on the first and second sets of wheel-support plates, and
the first and second bridges and the first and second sets of wheel-support plates define a service hole that is configured to be aligned with an underbody of the vehicle.

3. The vehicle lift of claim 2, wherein:
the first and second bridges include a plurality of bridge plates,
the bridge plates in each of the first and second bridges are configured to slidably engage one another such that:
when the platform is in a contracted state, the segmented plates overlap each other in a stacked configuration to reduce a length of the first and second bridges, and
when the platform is in an expanded state, at least some of the segmented plates partially overlap each other to increase the length of the first and second bridges compared to when the segmented plates are in the nested configuration.

4. The vehicle lift of claim 2, further comprising:
a first motor mechanically coupled to the first set of wheel-support plates, the first motor configured to translate the first set of wheel-support plates and a first pair of motorized lifts with respect to the first axis; and
a second motor mechanically coupled to the second set of wheel-support plates, the second motor configured to translate the second set of wheel-support plates and a second pair of motorized lifts with respect to the first axis,
whereby the first and second motors adjust the length of the platform.

5. The vehicle lift of claim 4, further comprising a controller in electrical communication with the first and second motors, the controller configured to send control signals to the first and second motors to set the length of the platform based on the wheelbase of the vehicle.

6. The vehicle lift of claim 5, wherein:
the length of the platform is set before the vehicle is driven onto the platform, and
the vehicle lift further comprises:
a plurality of sensors that detect a position of the vehicle on the platform; and
a processor circuit having an input coupled to an output of the sensors, the processor circuit configured to produce one or more sensory feedback signals that direct a driver of the vehicle to drive such that the tires are aligned with the clamps.

7. The vehicle lift of claim 3, further comprising:
an on-ramp attached to a first end of the platform; and
an off-ramp attached to a second end of the platform, the on-ramp and off-ramp including a plurality of nestable slats that are configured to slidably engage one another to vary respective lengths of the on-ramp and off-ramp with respect to the first axis.

8. The vehicle lift of claim 7, wherein the ramp and the platform are mechanically coupled such that the ramp is contracted when the platform is in the expanded state and the ramp is expanded when the platform is in the contracted state such that an overall length of the vehicle lift remains the same when the platform is in the expanded state and in the contracted state.

9. The vehicle lift of claim 7, further comprising:
a first expandable wall attached to the on-ramp and the platform; and
a second expandable wall attached to the off-ramp and the platform, the first and second expandable walls configured to expand when the when the platform is in the raised position and to contract when the platform is in a lowered position.

10. The vehicle lift of claim 3, further comprising a plurality of floor plates mounted on a bottom of the vehicle lift, the floor plates defining a floor that covers the service hole when the platform is in a lowered position.

11. The vehicle lift of claim 10, wherein:
when the platform is in the contracted state, the floor plates overlap each other to reduce a length of the floor, and
when the platform is in an expanded state, at least some of the segmented plates partially overlap each other to increase the length of floor compared to when the platform is in the contracted state.

12. A ground-supported structure for powering electric vehicles, comprising:
an enclosure for housing a vehicle during a delivery of energy to the vehicle, the enclosure having:
a plurality of side walls around the vehicle; and
a roof above the vehicle;
a platform that supports the vehicle, the platform located within the enclosure;
a plurality of motorized moveable vehicle lifts configured to lift and support the platform;
said motorized moveable vehicle lifts being moveable forward and backward, with respect to a first axis, to appropriate positions corresponding to wheelbase dimensions of the vehicle;
said motorized moveable vehicle lifts being moveable laterally, with respect to a second axis that is orthogonal to the first axis, to appropriate positions with respect to track dimensions of the vehicle; and
said motorized moveable vehicle lifts being moveable vertically to raise the platform above ground, with respect to a third axis that is orthogonal to the first and second axes, to define a service cavity for a service robot to clear and operate on an underside of the vehicle.

13. The ground-supported structure of claim 12, further comprising:
an on-ramp attached to a first end of the platform; and
an off-ramp attached to a second end of the platform, the on-ramp and off-ramp including a plurality of nestable slats that are configured to slidably engage one another to vary respective lengths of the on-ramp and off-ramp with respect to the first axis.

14. The ground-supported structure of claim 13, further comprising:
a first expandable wall attached to the on-ramp and the platform; and
a second expandable wall attached to the off-ramp and the platform, the first and second expandable walls configured to expand when the when the platform is in a raised position and to contract when the platform is in a lowered position.

15. The ground-supported structure of claim 14, further comprising a set of pedestrian stairs mounted on the first or second expandable wall for human exit and/or entry.

16. The ground-supported structure of claim 12, wherein the platform further comprises:
first and second expandable bridges, the first and second expandable bridges including a plurality of nestable bridge plates; and
a service hole defined between the first and second expandable bridges, the service hole aligned with the underside of the vehicle when the vehicle is on the platform.

17. The ground-supported structure of claim 16, further comprising an expandable floor mounted below the platform and aligned with the service hole so as to at least partially cover the service hole when the platform is in a lowered position, the expandable floor including a plurality of nestable floor plates.

18. The ground-supported structure of claim 12, further comprising:
a plurality of sensors that detect a position of the vehicle on the platform; and
a processor circuit having an input coupled to an output of the sensors, the processor circuit configured to produce one or more sensory feedback signals that direct a driver of the vehicle to drive to a predetermined position on the platform.

19. The ground-supported structure of claim 12, wherein the platform further comprises a plurality of lateral pushers and rollers, the lateral pushers configured to mechanically engage respective tires of the vehicle and push the respective tires along the rollers to set a lateral position of the vehicle with respect to the second axis.

20. The ground-supported structure of claim 19, wherein the lateral pushers comprise clamps that are configured to mechanically secure the lateral position of the vehicle while the platform is in a raised position.

21. The ground-supported structure of claim 20, wherein the clamps are mechanically coupled to the motorized moveable vehicle lifts such that a lateral movement of each motorized moveable vehicle lift causes a respective lateral movement of a respective clamp.

22. An electric-vehicle service station comprising:
an at least partially enclosed structure having:
at least one retractable door configured to receive a vehicle;
one or more sidewalls; and
a roof, the at least one retractable door, the one or more sidewalls, and the roof defining a service cavity; and
a ground-supported structure in the service cavity, the ground-supported structure comprising:
an enclosure for housing a vehicle during a delivery of energy to the vehicle, the enclosure having:
a plurality of side walls around the vehicle; and
a roof above the vehicle;

a platform that supports the vehicle, the platform located within the enclosure;

a plurality of motorized moveable vehicle lifts configured to lift and support the platform;

said motorized moveable vehicle lifts being moveable forward and backward, with respect to a first axis, to appropriate positions corresponding to wheelbase dimensions of the vehicle;

said motorized moveable vehicle lifts being moveable laterally, with respect to a second axis that is orthogonal to the first axis, to appropriate positions with respect to track dimensions of the vehicle; and said motorized moveable vehicle lifts being moveable vertically to raise the platform above ground, with respect to a third axis that is orthogonal to the first and second axes, to define a service cavity for a service robot to clear and operate on an underside of the vehicle.

* * * * *